United States Patent [19]

Smith, III

[11] Patent Number: 4,754,780
[45] Date of Patent: Jul. 5, 1988

[54] PRESSURE BALANCED HYDRAULIC COUPLING

[76] Inventor: Robert E. Smith, III, P.O. Box FF, Stafford, Tex. 77477

[21] Appl. No.: 13,000

[22] Filed: Feb. 10, 1987

[51] Int. Cl.⁴ .................. F16L 29/00; F16L 37/22
[52] U.S. Cl. ...................... 137/614.04; 251/149.1; 251/900; 285/900
[58] Field of Search ................ 137/614.01, 614.02, 137/614.03, 614.04, 614.05; 251/149.1, 149.8, 149.9, 900; 285/95, 345, DIG. 900

[56] References Cited

U.S. PATENT DOCUMENTS

| | | | |
|---|---|---|---|
| 2,218,318 | 10/1940 | Pfauser | 137/614.04 |
| 3,215,161 | 11/1965 | Goodwin et al. | 137/614.04 |
| 3,236,251 | 2/1966 | Hansen | 137/614.05 |
| 3,291,152 | 12/1966 | Comer | 137/614.04 |
| 3,348,575 | 10/1967 | Simak | 137/614.05 |
| 3,507,523 | 4/1970 | Cadley | 285/307 |
| 3,516,524 | 6/1970 | Kelty et al. | 192/3.3 |
| 3,618,690 | 11/1971 | Johnson | 251/900 |
| 3,707,878 | 1/1973 | Treichler | 92/164 |
| 3,777,771 | 12/1973 | De Visscher | 137/614.04 |
| 3,797,510 | 3/1974 | Torres et al. | 137/614.04 |
| 4,124,228 | 11/1978 | Morrison | 285/1 |
| 4,222,411 | 9/1980 | Herzan et al. | 137/614.04 |
| 4,348,039 | 9/1982 | Miller | 285/1 |

FOREIGN PATENT DOCUMENTS

| | | | |
|---|---|---|---|
| 663132 | 8/1929 | France | 137/614.04 |
| 1142462 | 9/1957 | France | 137/614.04 |
| 76801 | 10/1961 | France | 137/614.04 |
| 1491524 | 7/1967 | France | 137/614.04 |
| 343726 | 2/1960 | Switzerland | 137/614.04 |
| 552435 | 4/1941 | United Kingdom | 137/614.04 |

Primary Examiner—George L. Walton

[57] ABSTRACT

A pressure-balanced hydraulic coupling for use in undersea drilling and production operations, the coupling having radial passageways communicating between the male and female members such that substantial fluid pressure is not exerted against the face of either member during coupling or uncoupling or during the coupled state. Check valves in both the male and female members are opened when the male member probe is fully inserted into the receiving chamber of the female member. Mutually opposed valve stems extending from each check valve contact one another to effectuate the simultaneous opening of each check valve, and allow fluid to flow through a valve port and then radially through matching fluid passageways in the male and female members. The radial passageways of the male and female members match up at their longitudinal surfaces so that fluid pressure between the male and female members is in a substantially radial direction and is not exerted at the face of either member.

14 Claims, 2 Drawing Sheets

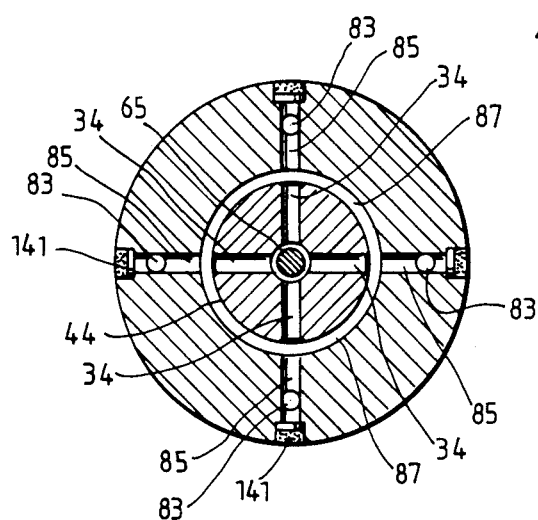
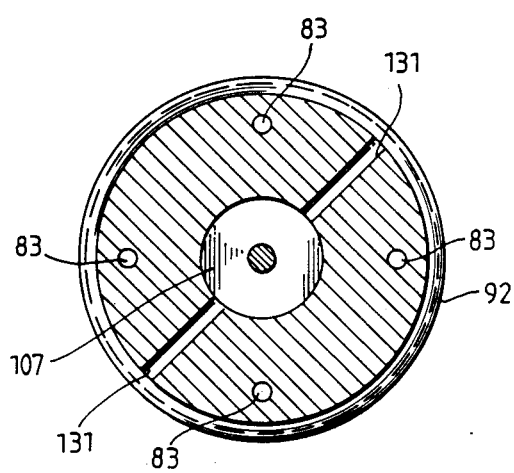
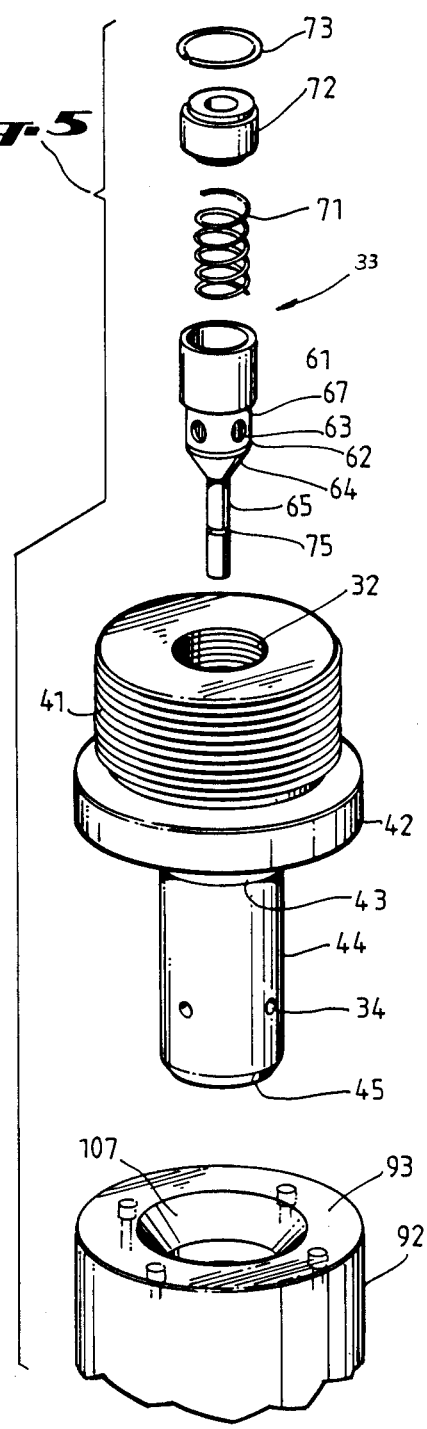

PRESSURE BALANCED HYDRAULIC COUPLING

BACKGROUND OF THE INVENTION

1. Field of the Invention

This invention relates, in general, to hydraulic couplings, and specifically to hydraulic couplings used in undersea drilling and production applications. More particularly, the invention involves a pressure balanced hydraulic coupling for connection or disconnection without exertion of any significant fluid pressure opposing either member of the coupling.

2. Description of the Related Art

Subsea hydraulic couplings are old in the art. The couplings generally consist of a male and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

Problems arise with the use of hydraulic couplings in relatively high pressure systems due to the high axial forces imposed on the male and female members during the coupling operation and during their use. In such couplings, it is necessary for the fluid force opposing the face of the male or female member to be overcome before the fluid communication is established between the members. In a relatively high pressure system, high forces imposed on the valve members may render the connection of the male member very difficult. Also, during use, fluid pressure is exerted between the male and female members in such as way as to tend to separate them. The force necessary to join the members and the resultant tendency of the body members to separate are characteristic problems in the prior art.

Ideally, hydraulic couplings should, as far as possible, be pressure balanced, so that fluid pressure does not hinder connection or urge separation of the male and female members. Preferably, to prevent loss of fluid in coupling or uncoupling, the members should include valve means to open automatically on coupling and close automatically on uncoupling. The present invention solves all of these needs and requirements.

SUMMARY OF THE INVENTION

The present invention resides in a hydraulic coupling of the foregoing type, including male and female members for fluid communication therebetween such that fluid passages are mutually positioned to allow connection or disconnection of the coupling without substantial fluid pressure exerted axially against the face of the male member. The fluid passages also are mutually positioned so as to substantially prevent separation of the male and female members when the passages are pressurized by fluid.

The fluid communication between the male and female members in the present invention preferably is established between a radial passageway at the outer longitudinal surface of the male member and a matching radial passageway in the inner receiving chamber of the female member. When the male member is fully inserted into the receiving chamber of the female member, fluid communication between the two members is established through the matched radial passageways. The leading faces of mutually opposed valve stems in the two members come into contact with one another, and thereby urge check valves in the respective members into the open position. When in the open position, fluid may flow through valve ports defined by the open check valves and through the radial passageways inboard of the valve seats.

BRIEF DESCRIPTION OF THE DRAWINGS

FIG. 3 is a cross-section view of the coupling along the lines 3—3 of FIG. 2.

FIG. 4 is a cross-section view of a coupling taken along the lines 4—4 of FIG. 2.

FIG. 5 is an exploded perspective view of the male member of the present invention.

DETAILED DESCRIPTION OF THE PREFERRED EMBODIMENT

A preferred embodiment of the present invention comprises a male member 10, a female member 20 and fluid passageways establishing fluid communication between the male member and female member when the male member is inserted into the female member. The fluid communication is established without significant pressure exerted against the face of the male member during or after insertion. The fluid communication between the male member and female member is established radially via a passageway in the outside longitudinal surface of the male member to a corresponding radial fluid passageway in the receiving chamber of the female member.

Figure 1:
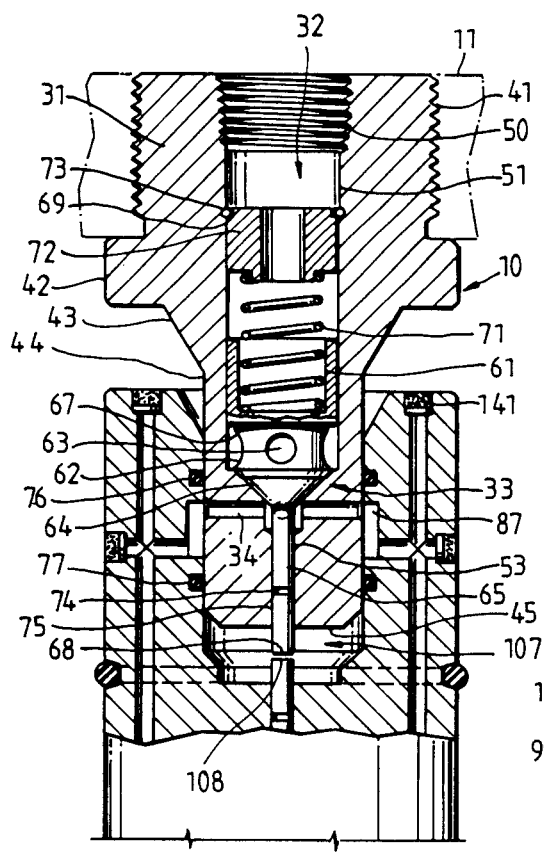
FIG. 1 is a section view of the male member partially inserted into the female member of a coupling according to the present invention.
Figure 2:
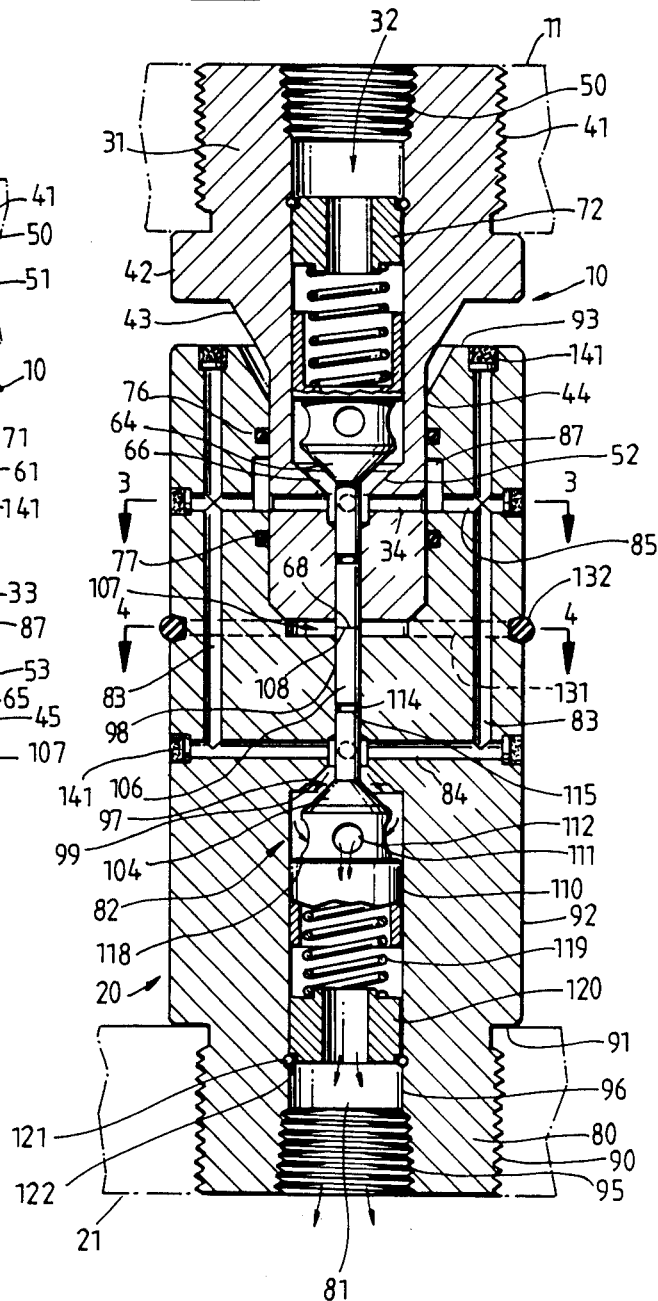
FIG. 2 is a section view of the male member fully inserted into the female member of a coupling according to the present invention.

In the preferred embodiment as shown in FIG. 1 and FIG. 2, the male member 10 comprises a body 31, a central bore 32, a valve assembly 33, and a radial passage 34. The body 31 of the male member first comprises a handle 41 which optionally is threaded or otherwise connected to a manifold plate 11. The male member 10 and female member 20 are generally connected to opposing plates of a manifold and are held together by bolts or hydraulic members attached to the plates of the manifolds. The male member is commonly attached to one plate 11, while the female member is attached to an opposing plate 21 so as to face the male member and align with it. The male and female members may be attached to the manifold plates using various means, such as set screws or threads. Techniques for attaching the members to such manifold plates are well known to those skilled in the art.

As shown in FIG. 1 and FIG. 2, the male member 10 includes a handle 41 which terminates at flange 42 of male member and tapered shoulder 43. The shoulder 43 is tapered down to the first end of the cylindrical probe wall 44 which terminates at probe face 45. The cylindrical probe wall 44 is adapted for sliding engagement with the female member, as will be discussed below. The body 31 of the male member, which is cylindrical in shape, thus includes handle 41, flange 42, shoulder 43, probe wall 44, and probe face 45.

The body of the male member also is provided with a central bore 32. The bore 32 may have several variations in its diameter as it extends through the body of male member. In a preferred embodiment, the first end of the central bore comprises an internally threaded section 50 for connection to a hydraulic line. Adjacent and inboard of the threaded section is a cylindrical passageway 51 extending longitudinally within the male member body and terminating at valve seat 52 which is an inclined shoulder. Adjacent to the valve seat is cylindrical passage 53 having a reduced diameter which comprises a receiving bore for the valve stem 65. In the embodiment shown in FIG. 1, the valve stem bore 53 is narrower than the cylindrical passageway 51 for receiving the valve stem 65 slidably therethrough.

As shown in FIG. 1, the valve assembly 33 is slidably received within the central bore 32 of the male member. The various parts of the valve assembly of the male member also are shown in an exploded perspective view of the male member in FIG. 5. The valve assembly comprises a cylindrical hollow valve head 61 which has an outer diameter dimensioned to slide within the cylindrical bore 51 of the male member, and a hollow cylindrical body section 62 having a outer diameter somewhat less than the diameter of the valve head. The cylindrical body section 62 includes valve body apertures 63 for fluid flow from the hollowed portion of the valve to the exterior of the valve. The cylindrical body section 62 terminates at valve face 64 which is conical in shape and dimensioned to seat within the valve seat 52 at the end of the male member bore. Extending from the valve face 64 is a valve stem 65 which is cylindrical in shape and extends along the longitudinal axis of the male member. The valve stem 65 is located at the apex of the conical shape of the valve face and is slidably received within the valve stem bore 53 of the male member, extending through the valve port 66.

Helical valve spring 71 is used to urge the valve face 64 into a closed position against the valve seat 52. The helical valve spring 71 is located within the cylindrical passageway 51 and anchored at hollow spring collar 72 which is held in place by collar clip 73 inserted within the spring collar bore 69 at the inner surface of the cylindrical passageway 51 of the male member 10 as shown in FIG. 1. The opposite end of the helical valve spring 71 is in contact with the shoulder 67 between the hollow valve head 61 and the hollow cylindrical body section 62. The valve face 64 is urged into a closed position against the valve seat 52 due to the helical valve spring 71.

Also shown in FIG. 1, annular valve stem seal 74 surrounding the outer circumference of valve stem 65 is secured within the valve stem seal groove 75 to seal the valve stem from fluid loss through the valve stem bore 53.

When the valve face 64 is in a closed position against the valve seat 52 as shown in FIG. 1, the valve assembly 33 seals fluid off from flowing between the central bore 32 and the radial passages 34 of the male member. One or more radial passages 34 in the body of the male member extend outwardly between the downstream or inboard side of the valve seat 52 and the outer circumference of the probe wall 44 of the male member. Annular probe seals 76 and 77 are situated about the circumference of the female receiving bore and are used to seal off fluid from escaping at the upstream or downstream side of the radial passageways 34 and 85 in the male and female members. The inboard probe seal 76 and outboard probe seal 77 thus help assure that fluid flow is directly and radially between the male member 10 and the female member 20.

As shown in FIG. 2, the valve assembly 33 of the male member 10 and the valve assembly 82 of the female member 20 are each urged into an open position when the valve stem face 68 of the male member contacts the mutually opposed valve stem face 108 of the female member. The valve port 66 in the male member 10 is defined between the valve face 64 and the valve seat 52 when the valve assembly 33 is in an open position. Fluid then may flow through the male member 10 via the central passageway 32, the valve body apertures 63, the valve port 66 and the radial passageways 34. Fluid flow is thus directed into the radial passageways 85 of the female member 20 between the inboard and outboard probe seals 76 and 77.

The female member 20 comprises a body 80, a central bore 81, a valve assembly 82, and a passageway having radial sections 84, 85 and a longitudinal section 83 for fluid flow therethrough. The body 80 of the female member includes handle 90 which is optionally threaded to the manifold plate 21. Female member body 80 also includes a shoulder 91 which is adjacent to the handle 90 and the main cylindrical body 92 which terminates at the female member face 93. The central bore 81 has several variations in its diameter, as it extends through the body 92 of the female member 20. At a first or outer end of the central bore 81 is a threaded internal passageway 95 for connection to a threaded hydraulic line. The threaded portion 95 of the central bore 81 terminates at cylindrical passageway 96 which slidably receives a valve assembly 82. Cylindrical passageway 96 terminates internally at valve seat 97 for seating the valve face 104. Inboard of the valve seat 97 is narrowed valve stem bore 98 which slidably receives the valve stem 106 of the valve assembly 82 of female member 20. Adjacent to the valve stem bore 98 is a cylindrical receiving chamber 107 which slidably receives the probe of the male member 10. As shown in FIG. 2, when the face 68 of the valve stem 65 of the male member 10 and the mutually opposed face 108 of the valve stem 106 of the female member 20 are slidably engaged in contact with one another, the valve assemblies 33 and 82 are forced into open positions for fluid flow in the radial passageways between the male and female members.

In a preferred embodiment of the present invention, the valve assembly 82 of the female member 20 is substantially similar to the valve assembly 33 of the male member 10 and comprises a hollow valve head 110 which is slidably received within the cylindrical passageway 96 of the female member 20. The female member valve assembly 82 further comprises hollow cylindrical body section 111 adjacent to the valve head 110. The cylindrical body section 111 has an outer diameter somewhat less than the outer diameter of the hollow valve head 110. The cylindrical body section 111 includes valve body apertures 112 for fluid flow between the inside and outside of the cylindrical body section 111. Adjacent to the cylindrical body section 111 is a valve face 104 which is generally conical in shape for seating at the valve seat 97, and valve stem 106 which is an elongated cylindrical section terminating in valve stem face 108. The valve stem 106 is located at the apex of the conical shape of the valve face 104 and extends through the valve port 90. The valve stem 106 of the female member 20 further is provided with valve stem seal 114 which is positioned in the annular valve stem seal groove 115. The valve stem seal 114 thus prevents fluid loss through the valve stem bore 98.

To urge the female member valve assembly 82 into the closed position, a helical valve spring 119 is mounted between the shoulder 118 of the valve head 110 and spring collar 120 having collar clip 121 within clip groove 122. The valve assembly 82 of the female member 20 and valve assembly 33 of the male member 10 are generally identical in components and function. When each valve is in an open position wherein the mutually opposed faces 68 and 108 of the two valve stems are in contact with each other as shown in FIG. 2, the helical valve spring bias is insufficient to keep the check valves in the closed position. The passageways for fluid communication between the male member and the female member thereby allow fluid flow without any significant pressure exerted on the leading face 45 of the male member 10.

The fluid passageways in the female member 20 comprise a first radial passageway 84 directed radially from the inboard end of the valve seat 97, a second radial passageway 85 positioned at the receiving chamber 107 of the female member 20, and a longitudinal passageway 83 connecting between the first and second radial passageways 84 and 85. When the male member 10 is fully inserted within the female member 20, the radial passageway 34 at the outer circumference of the probe wall 44 of the male member 10 matches the second radial passageway 85 of the female member 20 for fluid flow therebetween. An annular slot 87 cut about the circumference of the receiving chamber 107 of the female member 20 makes it possible to obtain fluid communication between the male and female members without precise alignment of the male member and the female member or exact rotational orientation of the male member with respect to the female member. The inboard and outboard probe seals 76 and 77 in the sides of the receiving chamber 107 of the female member 20 seal off fluid flow except between the respective radial passageways 34 and 85 of the male and female members. Fluid flow at the point of contact between the male and female members is perpendicular to the longitudinal axis of the male and female members where the radial passageway 34 of the male member 10 and second radial passageway 85 of the female member 20 communicate. Thus, there is no longitudinal force exerted by the fluid between the male and female members.

A cross-section view, taken along the plane referenced 3—3 in FIG. 1, shows the fluid passages of a preferred embodiment of the coupling in FIG. 3. As shown, four radial passageways 34 extend between the inboard end of the valve seat 52 of the male member 10 and the outer circumference of the probe wall 44. It will be recognized that any number of fluid passageways 34 may be used according to the present invention, depending on the fluid flow characteristics desired.

Still referring to FIG. 3, showing a cross-section of the male member 10 inserted into the female member 20, second radial passageways 85 of the female member 20 are shown extending between the receiving chamber 107 of the female member 20 and the longitudinal passageways 83. An annular slot 87 is cut about the circumference of the receiving chamber 107 of the female member 20 so that fluid communication between the male and female members is established even if each radial passageway 34 of male member 10 is not longitudinally or rotationally aligned with a second radial passageway 85 of the female member 20. As mentioned above, one, two, four, or any other number of fluid passageways may be employed according to the present invention without departing from the inventive concept. In fact, the number of radial passageways 34 and 85 need not be equal, although in the preferred embodiment, the radial passageways 34 and 85 are equal in number.

Preferably, when the male member is inserted into the female member, each radial passageway 34 of the male member 10 will match a separate second radial passageway 85 of the female member 20, so that the passageways 34 and 85 are mutually positioned to facilitate fluid communication between the members. However, the annular slot 87 permits rotation of the male member 10 relative to the female member 20 and axial movement of the male member 10 relative to the female member 20 while maintaining radial fluid communication therebetween.

In the preferred embodiment of the present invention, manufacture of the male and female members involves machining or drilling of the fluid passageways therethrough. Because the radial sections 84, 85 and longitudinal sections 83 of the fluid passageways are machined or drilled in the female member 20, the passageways extend through to the outer circumference of the female member and the female member face 93, respectively. These extensions of the radial and longitudinal fluid passageways of the female member are sealed with plugs 141 to prevent loss of fluid. It will be understood that these passageway extensions and the corresponding plugs 141 are not essential to the inventive concept. If another manufacturing technique for producing the device, such as casting, is employed, the passageway extensions and plugs 141 would not be required and may not be present.

As shown in FIG. 2 and in cross-section in FIG. 4, the female member 20 further includes one or more vent passages 131 for expelling water from the receiving chamber 107 of the female member 20. Each vent passage 131 connects between the central receiving chamber 107 and the outer surface of the female member 20. An annular vent hole seal 132 in a vent seal groove 133 is used to allow fluid flow only outwardly from the receiving chamber 107 when the male member 10 is inserted into the female member 20 and fluid is urged out of the central receiving chamber 107.

As one embodiment of the present invention is specifically adapted for use in subsea applications separation of the male and female members under water allows the entry of seawater into the receiving chamber 107 of the female member. Although this seawater is prevented from entry into hydraulic lines because of the valve assemblies 33 and 82, when the male member 10 begins to enter the receiving chamber 107, a hydraulic "lock" may develop within the chamber to prevent adequate entry of the male member 10. The vent passage 131 provides a means for the trapped seawater to be forced from the receiving chamber 107 upon entry of the male member 10. Further, should annular probe seal 77 or valve stem seals 74 and 114 develop a fluid leak, the resulting build-up of hydraulic fluid pressure within the receiving chamber 107 will be obviated by the vent passage 131. The fluid may escape through the vent passage and pressure will not build up to exert a separation force between the male and female members.

Although variations in the embodiment of the present invention may not each realize all the advantages of the invention, certain features may become more important than others in various applications of the device. The invention, accordingly, should be understood to be limited only by the scope of the appended claims.

What is claimed is:

1. A coupling comprising a male member having a leading face and a female member having a sealed receiving chamber for slidably receiving said leading face; radially directed fluid passages in the male and female members for communicating between the male and female members, whereby the leading face of the male member is never exposed to direct fluid pressure flowing through either member at any time when the male member is connected to and/or partially disconnected from the female member at any position for maintaining a balance force on the male member.

2. The coupling of claim 1 further including a plurality of fluid passages in the female member axially disposed from the centerline of the female member.

3. The coupling of claim 1 wherein the female member further includes a central bore and a valve seat at an inboard end of the bore; and the male member further includes a central bore and a valve seat at an inboard end of the bore; and wherein the fluid passages comprise a first radial passage at the inboard end of the valve seat of the female member, a second radial passage at the receiving chamber of the female member, a longitudinal passage interconnecting the first and second radial passages, and a third radial passage at the inboard end of the valve seat of the male member.

4. The coupling of claim 3 wherein said male member includes a first valve means slidable within said central bore of said male member to prevent fluid communication between said central bore of said male member and said third radial fluid passage of said male member, and wherein said female member includes a second valve means slidable within said central bore of said female member to prevent fluid communication between said central bore of said female member and said first radial fluid passage of said female member.

5. The coupling of claim 4 wherein the first and second valve means each comprise a hollow valve head, a hollow central portion having at least one aperture for fluid flow therethrough, a valve seal, a conical nose section, and a stem extending from each conical nose section; the stems being mutually opposed against one another and coming into contact to open the valve means when the male member is connected to the female member.

6. The coupling of claim 5 wherein the male member further includes a bore for slidably receiving the stem of the first valve means; and the female member further includes a bore for slidably receiving the stem of the second valve means.

7. The coupling of claim 4 further including bias means to urge the first and second valve means into the closed position.

8. The coupling of claim 1 further including a vent passage extending between the receiving chamber of the female member and the outside surface of the female member.

9. The coupling of claim 8 further including means for sealing the vent passage from fluid flow into the receiving end of the female member.

10. The coupling of claim 1 wherein said male member includes
a piston-like male body defining a normally closed, first passageway extending from the outer end of the male member to a first port along the lateral surface of the male member;
said female member defining a cylindrical chamber opening at its inner end to receive the inner end of the male body in a piston/cylinder relation and further defining a normally closed, second passageway extending from the outer end of the female member to a second port along the lateral surface of the chamber, said first and second ports positioned to be in fluid communication when said male body is in a preselected position within said female member; and
an actuator operable when said first and second ports are in fluid communication to open said first and second passageways.

11. The coupling of claim 1, wherein said
said female member including:
a first body member having an inner end and an outer end, defining a chamber extending axially into the body member from the inner end of the body member;
a first port extending into the first body member from the outer end of the first body member and terminating in a normally closed, outward opening first valve;
a first valve actuator extending from said first valve into said chamber in moveable, sealed relation with the first body member;
a first passageway in the first body member extending between the first valve and the wall of the chamber to convey fluid between the chamber and the first port when the first valve is open; and
said male member including:
a second body member adapted to enter within the chamber in moveable, sealed relation;
a second port extending into the outer end of the second body member and terminating in a normally closed, outward opening second valve;
a second valve actuator extending from said second valve into the chamber of the female member;
a third port in the second body member positioned to provide fluid communication between the second port and the first passageway when the second valve is open, and the second body member has entered the chamber, the inner ends of the two valve actuators and the third port positioned such that entry of the second body member into the chamber sequentially causes
(a) the third port to communicate with the first passageway, followed by
(b) actuation of both valve actuators to open the two valves.

12. A coupling comprising a male member and a female member;
the male member comprising a leading face, a central bore, a fluid passage extending radially from the central bore to the outer circumference of the male member, and first valve means to seal off fluid flow between the central bore and the fluid passage;
the female member comprising a sealed receiving chamber for slidably receiving the male member leading face, a central bore, a fluid passage having a first section extending radially from the central bore, a second section extending radially from the receiving chamber, and a longitudinal section interconnecting the first and second radial sections; and second valve means to seal off fluid flow between the central bore and the fluid passage;

whereby fluid communication exerted in a generally radial direction between the fluid passages of the male member and female member may be established by opening the first and second valve means without direct fluid pressure against the leading face of the male member at any time when the male member is connected to and/or partially disconnected from the female member at any position for maintaining a balance force on the male member.

13. The coupling of claim 12 wherein the first and second valve means each comprises a hollow valve head, a hollow central portion having a plurality of apertures for fluid flow therethrough, a valve seal, a conical nose section, and a stem extending from the conical nose section; the stems of the first and second valve means being mutually opposed against one another and coming into contact to force open the first and second valve means when the male member is connected to the female member; and wherein the male member further includes a bore for slidably receiving the stem of the first valve means; and the female member further includes a bore for slidably receiving the stem of the second valve means.

14. The coupling of claim 12 further including a vent passage extending between the receiving chamber of the female member and the outside surface of the female member; and means for sealing the vent passage from fluid flow into the receiving end of the female member.

* * * * *